(12) United States Patent
Buchmueller et al.

(10) Patent No.: US 11,913,484 B2
(45) Date of Patent: Feb. 27, 2024

(54) MOLDED PART FOR A NOZZLE CORE, NOZZLE CORE AND STUFF-CRIMPING DEVICE FOR CRIMPING, EXPANSION KIT, LOCKING DEVICE AND SETTING ELEMENT AS WELL AS METHOD THEREFOR

(71) Applicant: HEBERLEIN AG, Wattwil (CH)

(72) Inventors: Patrick Buchmueller, Krummenau (CH); Lukas Ruoss, Bütschwil (CH); Peter Forrer, Wil (CH); Gotthilf Bertsch, Ebnat-Kappel (CH); Christian Simmen, Wattwil (CH)

(73) Assignee: Heberlein Technology AG, Wattwil (CH)

( * ) Notice: Subject to any disclaimer, the term of this patent is extended or adjusted under 35 U.S.C. 154(b) by 383 days.

(21) Appl. No.: 16/951,104

(22) Filed: Nov. 18, 2020

(65) Prior Publication Data

US 2021/0079566 A1 Mar. 18, 2021

Related U.S. Application Data

(62) Division of application No. 15/739,215, filed as application No. PCT/EP2015/064898 on Jun. 30, 2015, now Pat. No. 10,883,202.

(51) Int. Cl.
*F16B 2/02* (2006.01)
*D02G 1/16* (2006.01)
*D02G 1/12* (2006.01)

(52) U.S. Cl.
CPC .............. *F16B 2/02* (2013.01); *D02G 1/122* (2013.01); *D02G 1/161* (2013.01); *Y10T 403/602* (2015.01)

(58) Field of Classification Search
CPC ...... F16B 2/02; F16B 2/06; F16B 2/12; F16B 7/105; F16B 9/02; F16B 21/125; F16B 21/18; F16B 21/02; F16B 21/12; Y10S 403/04; Y10S 403/14; Y10T 403/32483; Y10T 403/599; Y10T 403/60; Y10T 403/602; Y10T 403/7015; Y10T 403/7088; Y10T 403/71; Y10T 403/7117; Y10T 403/7176; Y10T 403/32557; Y10T 403/32581; Y10T 403/32591;
(Continued)

(56) References Cited

U.S. PATENT DOCUMENTS 874,653 A * 12/1907 Bathrom ................ G01B 3/566
403/93
2,489,864 A * 11/1949 Cravener ................ B66C 1/66
403/325
(Continued)

FOREIGN PATENT DOCUMENTS

DE 102008008516 A1 * 8/2008 ............. D02G 1/161
EP 1480307 A1 * 11/2004 ............. H02B 1/052
(Continued)

*Primary Examiner* — Josh Skroupa
(74) *Attorney, Agent, or Firm* — Finch & Maloney PLLC

(57) ABSTRACT

The invention focuses on a molded part (12) for a nozzle core (60) for stuffer-box crimping of threads. The molded part includes a ceramic body (121) with a planar surface (122). Receiving contours (124) for receiving fastening means (50) are arranged in the planar surface (122). The receiving contours (124) are open in the lateral direction.

5 Claims, 6 Drawing Sheets

(58) Field of Classification Search
CPC ........... Y10T 403/604; Y10T 403/7005; F16C 11/10; F16C 11/103
USPC ......... 403/109.3, 325, 326, 327, 353, 379.5, 403/384, 387, 397, DIG. 4, DIG. 14, 113, 403/116, 117, 328, 348
See application file for complete search history.

(56) References Cited

U.S. PATENT DOCUMENTS

| | | | | |
|---|---|---|---|---|
| 3,874,029 | A * | 4/1975 | McCullough | E05D 11/1007 16/329 |
| 5,265,969 | A * | 11/1993 | Chuang | F16C 11/10 403/93 |
| 5,586,363 | A * | 12/1996 | Fanuzzi | F16C 11/10 16/329 |
| 6,338,586 | B1 * | 1/2002 | Kuo | A45C 13/262 403/109.7 |
| 7,260,875 | B2 | 8/2007 | Stündl et al. | |
| 8,459,679 | B2 * | 6/2013 | Jessie, Jr. | B62K 9/02 280/282 |
| 8,480,258 | B2 * | 7/2013 | Chen | F21V 14/02 362/545 |
| 8,671,799 | B2 * | 3/2014 | Chen | G05G 5/065 403/325 |
| 10,247,520 | B2 * | 4/2019 | Manly | F41C 27/18 |
| 10,288,123 | B2 * | 5/2019 | Newth | F16B 7/042 |
| 11,389,942 | B1 * | 7/2022 | Stoltz | B25G 1/005 |
| 2016/0082773 | A1 * | 3/2016 | Morris | B60B 37/10 403/325 |
| 2023/0031922 | A1 * | 2/2023 | Wang | F16B 2/12 |

FOREIGN PATENT DOCUMENTS

| | | | | |
|---|---|---|---|---|
| EP | 1 634 982 A1 | | 3/2006 | |
| JP | 58084214 A | * | 5/1983 | ............. F16C 11/10 |
| JP | H06-123033 A1 | | 5/1994 | |
| WO | WO-2009068766 A1 | * | 6/2009 | ............. F16C 11/10 |
| WO | WO-2010106069 A1 | * | 9/2010 | ............. F16B 21/02 |

* cited by examiner ered, is that only some and consequently not all fastening means have to be removed. A
MOLDED PART FOR A NOZZLE CORE, NOZZLE CORE AND STUFF-CRIMPING DEVICE FOR CRIMPING, EXPANSION KIT, LOCKING DEVICE AND SETTING ELEMENT AS WELL AS METHOD THEREFOR This application is a divisional of U.S. patent application Ser. No. 15/739,215 filed Dec. 22, 2017, which is a National Stage completion of PCT/EP2015/064898 filed Jun. 30, 2015.

FIELD OF THE INVENTION

The present invention relates to a molded part for a nozzle core for stuffer-box crimping, to a nozzle core for stuffer-box crimping, to a nozzle for stuffer-box crimping and to a stuffer-box crimping device for stuffer-box crimping, to an expansion kit for expanding a texturing machine, to a locking device for locking a nozzle and to a setting element for receiving nozzles as well as to the corresponding methods for this purpose according to the preambles of the independent claims.

BACKGROUND OF THE INVENTION

Different devices, nozzles, nozzle cores and molded parts for stuffer-box crimping of a, preferably synthetic, multifilament thread are disclosed in the prior art. Thus, for example, EP 1 634 982 B1 discloses a nozzle and a device for stuffer-box crimping which includes a metallic housing and at least one nozzle core produced from two molded parts. The molded parts are connected in each case to the housing by means of a dowel pin and an axial guide. Such devices and the associated molded parts are costly to produce and are sensitive to mechanical stress and thermal expansion. The complicated shape prevents simple maintenance and repair of the device, precisely the thermal sensitivity of said design necessitating frequent replacement of individual components.

SUMMARY OF THE INVENTION

It is the object of the invention to eliminate these and further disadvantages of the prior art. A molded part for a nozzle core which is simple to produce and easy to exchange is to be provided, in particular. A nozzle for stuffer-box crimping, which preferably comprises the named advantages is also to be provided. Expanding existing texturing machines with molded parts according to the invention is preferably to be made possible. An advantageous locking device for locking one or multiple nozzles for stuffer-box crimping and a setting element for receiving nozzles for stuffer-box crimping are also to be provided.

These and further objects are achieved by the devices and methods defined in the independent claims. Further embodiments are produced from the dependent claims.

A molded part according to the invention for a nozzle core for stuffer-box crimping of threads, and preferably for stuffer-box crimping of synthetic multifilament threads, includes a ceramic body with a planar surface. A cavity for forming at least part of a nozzle duct is arranged in the planar surface. The cavity is preferably arranged centrally in the planar surface and preferably forms half a nozzle duct. Receiving contours for receiving fastening means are arranged in the planar surface. The receiving contours are situated laterally on the molded part with reference to the cavity. The receiving contours are open in the lateral direction, proceeding from the cavity and along the planar surface.

With reference to the planar surface, the molded part comprises a longitudinal extension along the cavity. The molded part consequently comprises a planar surface to which end faces and lateral sides are assigned.

Fastening means make it possible to fasten the molded part on a suitable reception or on a suitable counter piece.

The realization of the receiving contours, such that they are open in the lateral direction, makes it possible to fasten the molded part on the counter piece without the fastening means having to be removed completely. As an alternative to this, it is also possible, or conceivable, that only some and consequently not all fastening means have to be removed. A further advantage of open contours is that it is possible to prevent stress peaks which can be generated, for example, as a result of thermal effects.

In a preferred embodiment, a stop face, which is offset parallel to the planar surface of the molded part, is arranged inside the receiving contour of the molded part.

On the one hand, this enables the molded part to be fastened in a manner that is independent of the planar surface. Damage to or violations of the planar surface can be avoided in this way. On the other hand, a stop face which is offset in parallel also makes it possible for said stop face to be realized or to be able to be realized corresponding to the chosen fastening means, irrespective of the configuration of the planar surface.

The planar surfaces preferably do not comprise any recesses or passages, in particular the planar surfaces do not include any recesses or passages for fastening means which are completely situated in the planar surface.

This means that preferably there are no closed contours for fastening means or securing means situated inside the planar surface.

Open contours enable stress equalization. Thermal or mechanical stress peaks are avoided in this way.

The molded part, in this case, can comprise receiving contours on the lateral sides, it being possible for the lateral sides of the molded part to be realized continuously and substantially parallel to the cavity between the receiving contours.

The molded part can comprise an extension as part of a nose. Said nose is preferably formed by a first cone and a second cone in a direction of movement of the thread. The first cone comprises a larger base in one cross section of the nose than the second cone in the same cross section of the nose.

This enables an outlet nose to be created for the thread which is mechanically loadable and simple to produce.

The molded part can preferably comprise an inlet region and an outlet region. Inlet region and outlet region are arranged in a preferred manner on the end face or on the end sides. The inlet region or the outlet region is the region in which the cavity or the contour of the molded part is realized separately for the purpose of the inlet or outlet of the thread. Said regions preferably extend in each case over approximately 20% of the overall length of the molded part from the end faces of the molded part. In a preferred embodiment, the receiving contours are arranged in said regions and preferably only in said regions. This means that, in this case, receiving contours are situated only in said regions.

This makes it possible for the planar surface to be substantially free of interfering contours or interruptions, which has a positive effect on the strength of the molded part.

The inlet region and the outlet region of the molded part is in each case the region at which the thread enters into or respectively exits from the cavity. Said regions can be specifically configured. Thus, for example, the inlet region can comprise a conically tapering opening. The outlet region is preferably configured in such a manner that a nose is arranged in said region as described in the present case.

To prevent movement of the molded part along a direction of movement of the thread, the molded part can comprise delimiting faces on at least one receiving contour.

Movement along the direction of movement of the thread means that the molded part is moved in or in opposition to the direction of movement of the thread. Said movement is caused, in particular, by length expansions on account of thermal effects.

As an alternative to this, it is conceivable that delimiting contours are provided on a flange interface on the molded part. The delimiting faces or delimiting contours, in this case, are preferably arranged substantially at right angles to the direction of movement of the thread.

In a preferred manner, the delimiting faces or delimiting contours comprise in each case a first and a second delimiting face in and in opposition to the direction of movement of the thread. This enables, on the one hand, the precise positioning of a molded part, on the other hand, in this case, at least one region of the molded part is held at a predetermined location irrespective of the temperature. Such delimiting faces or delimiting contours are preferably only situated in each case at the inlet region or at the outlet region of the molded part.

The cavity in the molded part can comprise at least one first region and one second region arranged one after the other in the direction of movement of the thread, wherein the second region comprises a greater cross-sectional area than the first region.

Specific characteristics can be set up for different threads inside the molded part by means of different regions. With different molded parts, it is possible, in this case, to set up different characteristics for a specific thread or multifilament thread.

An inlet for a fluid, preferably hot air or vapor, can be provided in the molded part, which inlet is preferably arranged at least in part along the cavity and opens out into said cavity by way of a mouth. Such a mouth can be situated, in this case, on the two lateral sides of the cavity.

An impact on the threads directed in the direction of movement of the thread and, as a result, texturing of the threads is consequently made possible.

The mouth of the fluid inlet is situated, in this case, preferably between a first and a second group produced from receiving contours.

Such an arrangement makes it possible for the fluid inlet to be situated consequently substantially inside the planar surface without there being interaction, for example, with the fastening means on the receiving contours.

A first group of receiving contours preferably comprises a first type of receiving contours with a stop face and a second type of receiving contours with a delimiting face and a second group of receiving contours preferably comprises only receiving contours of the first type. As an alternative to this, it is also possible for the second group also to comprise a receiving contour of the second type. The receiving contours of the second type, in this case, can be arranged on the identical side of the cavity. A crossed arrangement, however, is also possible. The precise choice of the types of receiving contours and the arrangement thereof on the molded part and in individual groups is dependent, in this case, on the desired purpose or on the desired function.

A further aspect of the invention relates to a nozzle core which includes at least two molded parts as described in this case.

The molded parts are preferably realized in a structurally identical manner to one another, the respective cavities of the molded parts forming a nozzle duct with inlet and outlet.

Delimiting faces or delimiting contours on the molded parts are situated in the same region in the case of the two molded parts. The deformations of the molded parts and in particular the thermal expansion is consequently effected in a synchronous manner and in the same direction in the case of the two molded parts.

The inlet can preferably be conically formed as described in the present case and the outlet can preferably form a nose as described in the present case.

Such a nozzle core comprises the advantages of the molded parts and is simple to produce as it is producible from similar individual parts.

A further aspect of the invention relates to a nozzle for stuffer-box crimping of threads and preferably of synthetic threads. The nozzle includes a nozzle core, and preferably a nozzle core as described in the present case. The nozzle or the nozzle core includes at least two molded parts and preferably at least two molded parts as described in the present case. The molded parts comprise two lateral sides each.

The lateral sides extend substantially in a conveying direction of the threads. The molded parts comprise one planar surface each, which is situated between the lateral sides. The planar surfaces comprise at least one cavity each for forming a nozzle duct.

The nozzle comprises flanges which are produced at least in part from metallic material and preferably steel. On their lateral sides, the molded parts comprise a receiving contour for receiving fastening means. The molded parts, in this case, are fastened or fastenable by way of the fastening means on at least two flanges each.

The receiving contours, in this case, are preferably realized as described in the present case and are open in a lateral direction.

Receiving contours on lateral sides of the molded parts make it possible, on the one hand, first of all to fasten the molded parts on flanges, on the other hand it allows for such fastening that the molded parts are only stressed at the edge of the planar surface. The fastening of the molded parts on flanges additionally makes it possible to obtain a specific interface which is realized by the flanges. In this case, the flanges can be realized, for example, in such a manner that, for example, they can be moved into operative connection with a texturing machine.

The flanges are preferably formed from individual portions of a ring. This enables simple production and makes it possible to use the flanges in a rotationally symmetrical manner.

The nozzle can include at least two housings which consist at least in part of metallic material and preferably of steel. Each house can preferably be realized integrally with at least two flanges each. In this case, the at least two molded parts of the nozzle can be surrounded at least in part by a housing each.

This enables the provision of a nozzle in which the molded parts are mountable in a defined position, the molded part and the flanges, in this case, being situated in positions that are defined in each case with respect to one another. The nozzle is consequently insertable in a simple manner into a texturing machine.

One or multiple elastic elements and preferably seals, which are preferably self-adhesive, can be situated in each case between the molded parts and the housing or can be arranged therein.

This makes it possible, on the one hand, to separate the housing and the molded part thermally and, at the same time, to reduce heat transmission. The reduction in heat transmission promotes uniform heat distribution inside the molded part. Heat differences from different regions of the molded part with respect to one another can consequently be reduced. On the other hand, irregularities in the individual parts and on their interfaces can be equalized. Consequently, stresses in the individual parts can be reduced or prevented.

The fastening means can comprise screws and/or pins.

Screws, in this case, fasten the molded part and hold the molded part in a direction at right angles to the planar surface at one place. The pins can be arranged in such a manner that they act in each case only against one single movement component, thus, for example, a pin can act against a lateral displacement and two further screws against a displacement in the direction of movement of the thread. Using an additional screw and three pins, the molded part is consequently secured in all three axes.

However, it is also conceivable for a displacement in the lateral direction to be able to be prevented by means of a flank realized for this purpose on the molded part.

The nozzle is preferably realized in such a manner that at least one of the flanges per molded part comprises sliding faces which are realized in such a manner that a movement, for example on account of thermal expansion of the respective molded part, is made possible in the direction of movement of the thread.

The sliding surfaces are preferably realized in such a manner that a displacement in the lateral direction is prevented or preventable.

This makes it possible for the molded part to be fastened fixedly at least in the direction of movement of the thread in the region of a first flange, and to be able to expand, however, in the region of the second flange.

A further aspect of the invention relates to a nozzle for stuffer-box crimping of threads, in particular to a nozzle as described in the present case, wherein the nozzle includes a nozzle core. The nozzle preferably includes a nozzle core as described in the present case. The nozzle or the nozzle core includes at least two molded parts, preferably as described in the present case. The molded parts have a planar surface each. The planar surfaces comprise at least one cavity each for forming a nozzle duct. The nozzle comprises flanges which are produced at least in part from metallic material and preferably from steel. The flanges are connected in each case to a molded part of the nozzle core. At least one flange and preferably each flange of each molded part comprises at least one non-rotationally symmetrical locking structure which is designed as an anti-rotational mechanism in a locking device of a texturing machine.

This enables insertion or fastening or locking and/or a combination of said functions in a texturing machine.

In this case, precise positioning is made possible as a result of such a locking structure.

A nozzle as described in the present case is preferably realized in such a manner that at least two molded parts are realized in a structurally identical manner to one another and the cavities form a nozzle duct with inlet and outlet, as described in the present case.

This makes simple design and simple production of such a nozzle possible. At least one flange of each molded part and preferably each flange of each molded part can comprise a guide element for guiding in a receiving contour of a reception of a texturing machine for inserting the nozzle. The guide element, in this case, can be realized, for example, as a web or by one, two or more bolts.

As a result, precise insertion into a texturing machine is made possible, which makes interchangeability of the nozzle possible.

At the outlet of the threads out of the nozzle core, the nozzle, in particular the nozzle core, can comprise a nose, the nose being able to be realized as described in the present case. In this case, the nose can be no more than 12 mm, preferably 10 mm and particularly preferred no more than 7.5 mm in length.

The nose is situated in an outlet region of the nozzle core and tapers in the direction of movement of the thread. The nose preferably includes multiple cones as described in the present case, which are, in particular, in each case, at an angle of 60 degrees.

A further aspect of the invention relates to a stuffer-box crimping device for stuffer-box crimping of threads and preferably of synthetic multifilament threads. The stuffer-box crimping device includes a nozzle as described in the present case and a stuffer box which is arranged downstream of the nozzle in the direction of movement of the thread.

A complete stuffer-box crimping device can be provided as a result.

A further aspect of the invention relates to an expansion kit for expanding a texturing machine. The expansion kit includes at least one molded part as described in the present case or a nozzle as described in the present case. The expansion kit also includes an inlet element for a stuffer box, wherein the inlet element comprises a receiving region for a nose of a nozzle core, which nose is formed in a direction of movement of the thread by a first cone and a second cone. The first cone comprises a larger base on a cross section of the nose than the second cone on the same cross section of the nose.

This makes it possible to expand and evaluate an existing texturing machine in a simple manner.

The expansion kit can include one or multiple locking devices as described below.

Nozzles, as described in the present case, are used or are usable in texturing machines.

A further aspect of the invention relates consequently to a locking device for locking one or multiple, preferably three, nozzles for stuffer-box crimping, in particular as described in the present case. The locking device is realized, in particular, for locking such a nozzle in a texturing machine. The locking device includes at least one locking carrier and at least one and preferably multiple locking elements. The locking elements comprise at least one recess for receiving a locking structure of a nozzle. The locking elements are fastened or are fastenable on the locking carrier. The locking elements are arranged or arrangeable in such a manner that a directed force acts on the locking elements in the direction of a nozzle inserted into the recess.

Consequently, nozzles can be located and fixed and/or locked at a desired site and in a desired position. A stuffer-box crimping operation is made possible by the locking device.

The directed force can be provided by at least one and preferably two or more elastic elements of the locking device, and in particular springs.

Such a locking device can consequently be produced in a cost-efficient manner using standard parts.

The locking elements can be fastened or are fastenable releasably, in particular by way of a cover element and screws, on the locking carrier.

It is consequently possible to exchange and maintain the individual elements.

The locking carrier can be produced at least in part from plastics material and preferably from glass-fiber reinforced epoxy.

This ensures a dimensionally stable locking carrier which is relatively insensitive with reference to thermal influences.

The locking elements of the locking device are preferably produced at least in part from metal and preferably from steel. The locking elements are sturdy as a result.

A further aspect of the invention relates to a setting element for receiving nozzles for stuffer-box crimping, in particular for nozzles as claimed in the present case. The setting element includes at least one handle and at least one receiving element. A holder, which is mounted rotatably in the receiving element, is provided. Also provided is an actuating element for rotating the holder. The holder is movable at least between a hold position for holding the nozzle in the receiving element and a release position for receiving the nozzle in and discharging it from the receiving element.

Such a setting element enables the insertion of a nozzle into a texturing machine for stuffer-box crimping and its removal out of said machine. In this case, secure holding of the setting element is made possible by the handle. The handle is preferably produced from a heat-insulating material or includes heat-insulating material. This also makes it possible to replace a nozzle for stuffer-box crimping, for example during an operational interruption when the machine or the nozzle is at temperatures that are elevated with respect to the ambient air.

Such a setting element makes it possible to receive the nozzle without coming into contact with the nozzle. This is also supported and/or made possible by the actuating element.

The holder of the setting element can be realized as a cylinder, which is open in the circumferential direction and preferably is open over approximately half of the circumference, with a preferably circular cross section.

This consequently enables the receiving of a first half of a nozzle core and consequently of a molded part with at least two flanges as described in the present case.

The receiving element can comprise a receiving lock for locking the holder. The locking of the holder prevents un-authorized or unwanted rotating or moving of the holder and secures a nozzle, which is held by the setting element, against loss. The receiving lock, in this case, can be realized as a pin, the pin being movable into a closed position and into an open position. As an alternative to this, it would also be conceivable to provide a ball, preferably a spring-mounted ball, which engages in locking elements, for example openings or depressions, of the holder. Such locking elements can be cylindrical, and, for example, all arranged on the holding element at 45°. In this case, a rotational movement of the holder is prevented in the closed position. The advantages of such a locking mechanism are described in the present case.

A further aspect of the invention relates to a method for producing stuffer-box crimped threads and/or yarns, in particular to a method for producing stuffer-box crimped synthetic, multifilament threads. The threads are stuffer-box crimped by means of a molded part as described in the present case or by means of a nozzle core as described in the present case or by means of a nozzle as described in the present case.

BRIEF DESCRIPTION OF THE DRAWINGS

The invention is explained below by way of figures, in which.

DETAILED DESCRIPTION OF THE PREFERRED EMBODIMENTS

Figure 1:
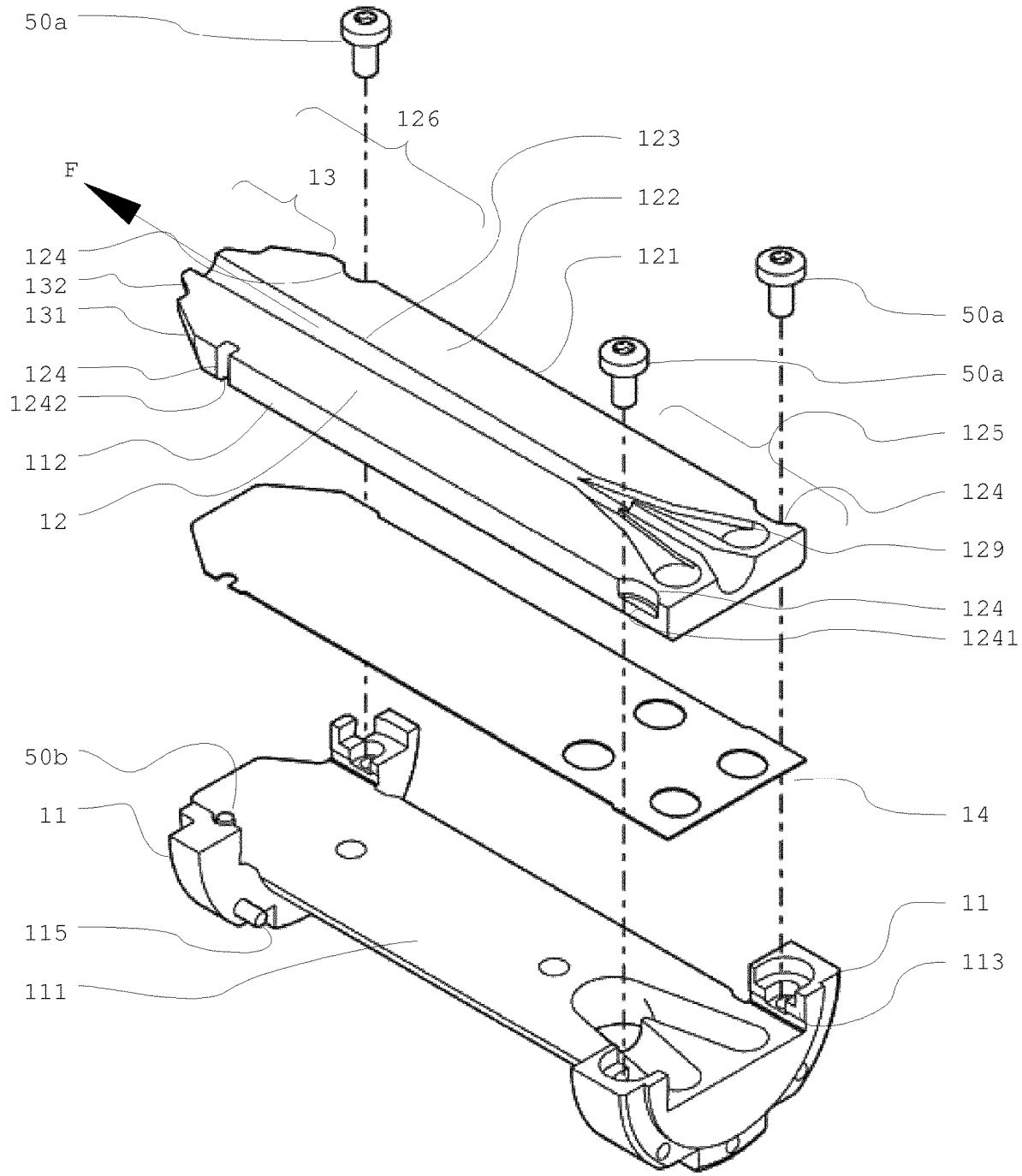
FIG. 1: shows a first embodiment of a molded part

FIG. 1 shows a first embodiment of a molded part 12 according to the invention. The molded part 12 is arranged in a housing 111.

The molded part 12 consists substantially of a ceramic body 121 and comprises a planar surface 122. The molded part 12 comprises an inlet region 125 and an outlet region 126.

The housing 111 comprises two flanges 11. Three screws 50*a* protect the molded part 12 from falling out of the housing 111.

The molded part 12 comprises a conical widening in the inlet region 125 and a nose 13 in the outlet region 126. The nose 13 comprises two cones 131 and 132 which are arranged one behind the other. Both cones 131, 132 are at an angle of 60 degrees. The cone 131 comprises, on a cross-sectional area through the molded part 12, a larger base than the cone 132 on the same cross-sectional surface. Each of the regions 125 and 126 define end faces. A cavity 123 extends longitudinally through the molded part 12. Lateral sides, to which receiving contours 124 are assigned, are situated on both sides of the cavity 123. The receiving contour 124, on the right-hand side in the present figure, comprises a stop face 1241 which is offset parallel to the planar surface 122. In the installed state, the screws 50*a* are at a spacing from said stop face 1241 with the underside of their head, such that no forces of the screws 50*a* act on said faces. Fixing takes place at right-angles to the planar surface 122 preferably as a result of the mounting of a nozzle core, a planar surface 122 of a first molded part acting on the planar surface 122 of a second molded part.

A fluid inlet 129, which opens out into the cavity 123, is arranged inside the planar surface 122. The fluid inlet 129 extends substantially along the cavity 123 as well as on both sides of the cavity 123. A receiving contour 124, which comprises two delimiting faces 1242, is arranged on the left-hand side in the present figure. The delimiting faces 1242 are arranged substantially at right angles to a direction of movement F of the thread, a delimiting face 1242 being arranged in such a manner that movements in the direction of movement F of the thread can be received and a delimiting face 1242 being arranged in such a manner that movements in opposition to the direction of movement F of the thread can be received.

FIG. 1 also shows a housing 111 which is produced in the present case from steel. Flanges 11 are arranged on both sides of the housing. Guide elements 115, which in the present case are realized as individual bolts, are arranged on the flanges 11. The guide elements 115 enable the guided insertion of the nozzle half shown in FIG. 1 in a texturing machine and correspond with a receiving contour 711 of a texturing machine (see FIG. 3).

The housing 111 and the flanges 11 are produced integrally in the present case. The flanges 11 comprise sliding faces 113 which make it possible for a molded part 12, which is fastened in the housing 111, to be able to expand in the direction of movement F of the thread. The sliding faces 113 interact with the flange interfaces 112 and prevent the molded part 12 from being displaced laterally. A seal 14 is arranged as an elastic element in the housing 111. Fastening means are provided as a result of fastening the molded part 12 in the housing 111, three screws 50a being used in the present case for fastening. A further fastening means is realized as a pin 50b.

Figure 2:
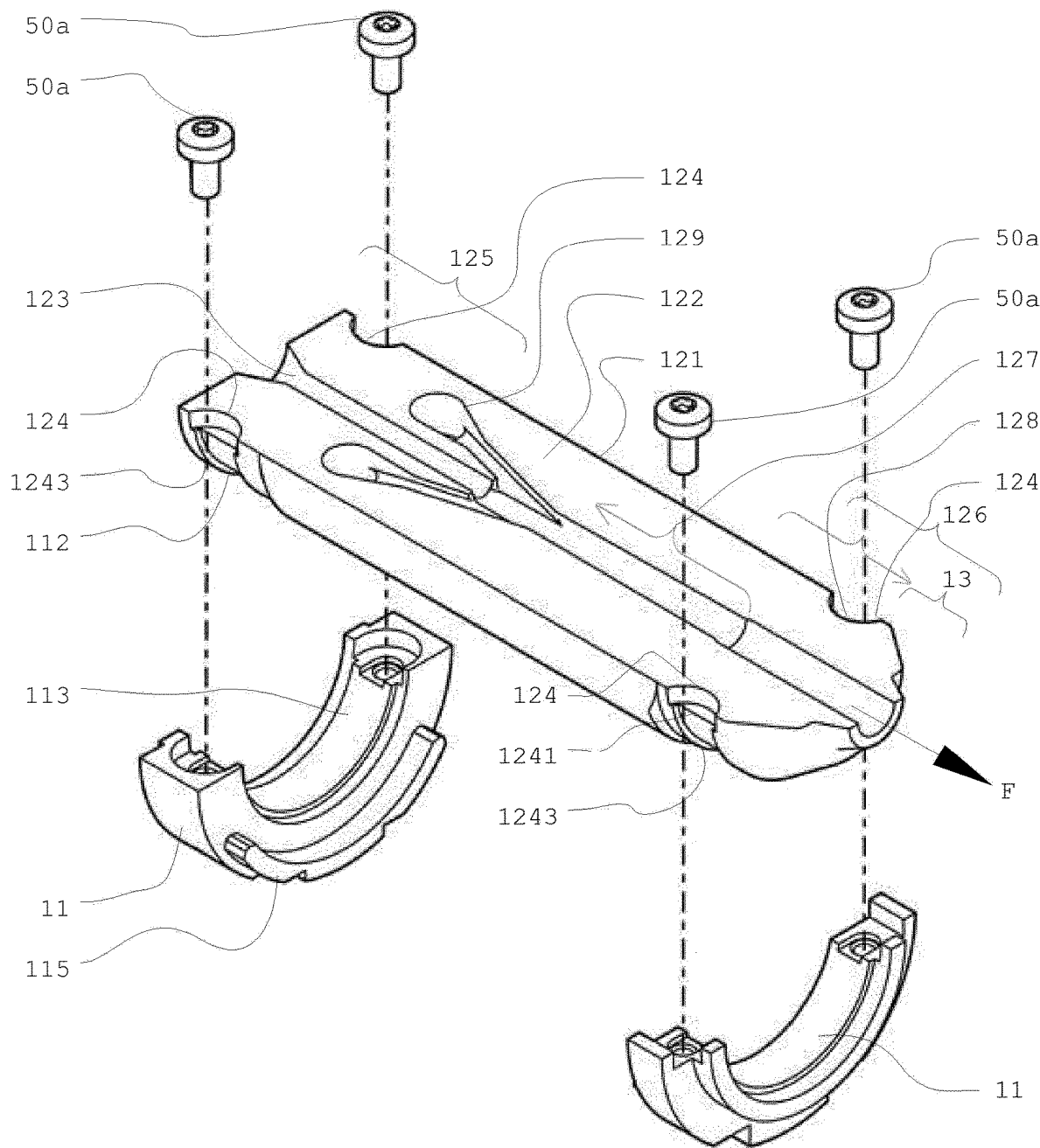
FIG. 2: shows a second embodiment of a molded part

FIG. 2 shows a further embodiment according to the invention of a molded part 12. In contrast to the molded part 12 from FIG. 1, the molded part 12 from FIG. 2 comprises a substantially semicircular cross section. The housing 111 (see FIG. 1) is realized in the present case simply as two individual flanges 11. Guide elements 115, which are realized as webs in contrast to the guide elements 115 from FIG. 1, are situated on the flanges 11. The planar surface 122 of the molded part 12 is realized in a substantially similar manner to the planar surface 12 from FIG. 1. In contrast thereto, four similar receiving contours 124 with stop faces 1241 are situated on the molded part 12 from FIG. 2. There are no delimiting faces 1242 (see FIG. 1) on the receiving contours. Instead of which, a flange interface 112, which interacts with sliding faces 113 of the flange 11, is situated on the molded part 12. Delimiting contours 1243, which prevent displacement of the molded part 12 in a direction of movement F of the thread, are situated on the flange interface 112. The molded part 12 is consequently held in a stationary manner on at least one flange 11. It is not necessary to provide any delimiting faces on the receiving contours 124 in order to prevent such displacement.

A cavity 123, which, in the present case, includes two regions, a first region 127 and a second region 128, is arranged in the planar surface 122. The second region 128 comprises a cross section which is larger compared to the first region 127. The widened cross section of the second region 128 is situated at an outlet region 125 of the molded part 12. The molded part 12 from FIG. 2 is consequently provided for yarn thicknesses greater than 1800 decitex (polypropylene), whereas the molded part 12 from FIG. 1 is provided for thinner yarns. The yarn duct cross sections of the molded parts of 12 FIGS. 1 and 2 are mutually exchangeable. A nose 13, which is realized in a similar manner to the nose 13 from FIG. 1, is also situated in said outlet region 125. The molded part 12 in FIG. 2 comprises a flange interface both in the outlet region 126 and in the inlet region 125, the flange interface 112 also comprising delimiting contours 1243 in the outlet region 126. The flanges 11 are consequently connected in a captive manner to the molded part 12. Expansion in the direction of movement F of the thread can consequently take place in a reception of the flanges 11 on a texturing machine.

Figure 3:
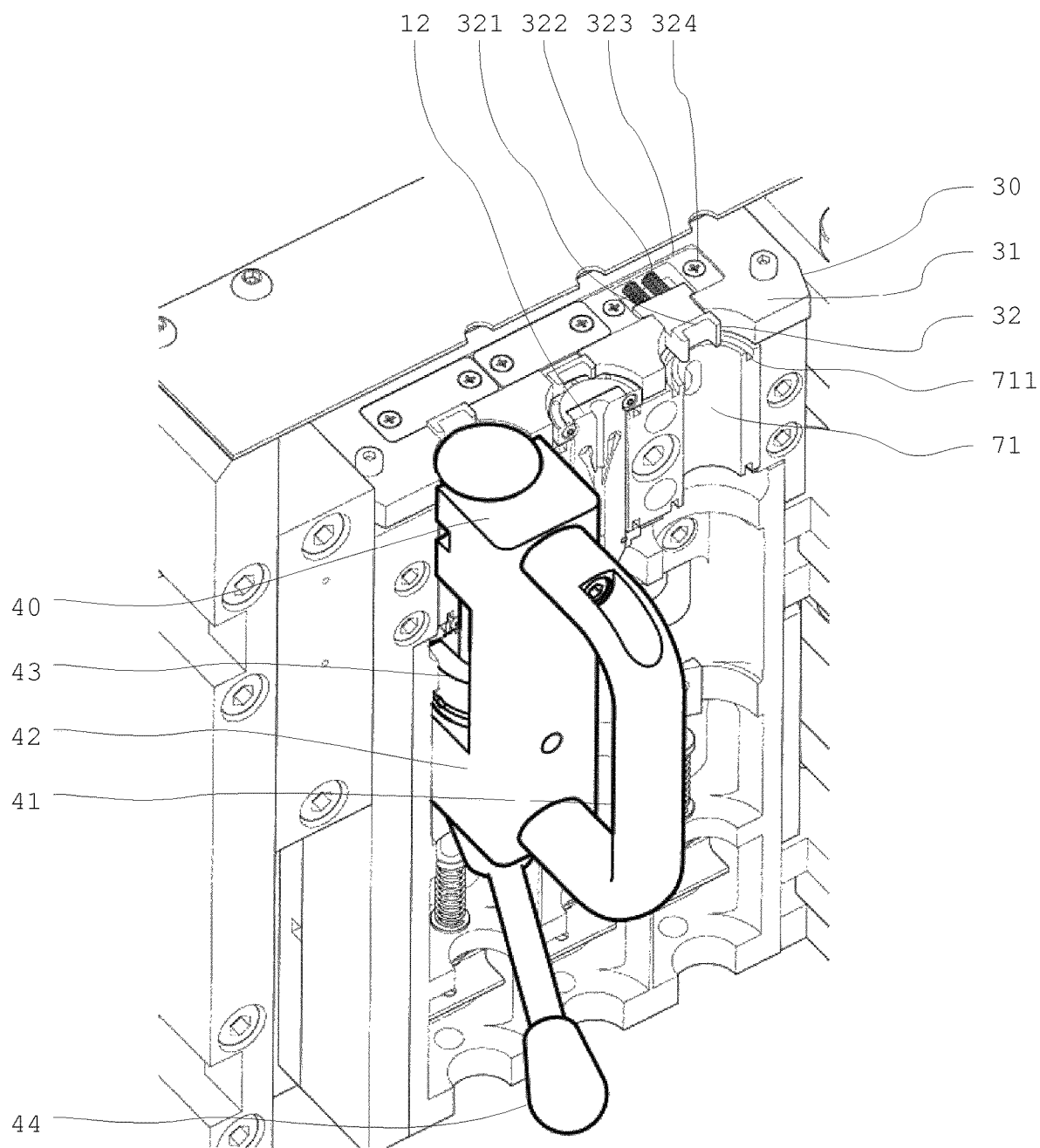
FIG. 3: shows a setting element and a locking device in a texturing machine

FIG. 3 shows a detail of a texturing machine with three receptions 71 for receiving nozzles 10 for stuffer-box crimping. For better clarity, however, only one reception 71 and the associated components belonging to said reception 71 are shown. A receiving contour 711 is shown in the reception 71. The texturing machine, in the present case, comprises three receptions 71. A first half of an already inserted nozzle is shown in the center reception. A setting element 40 for inserting or removing a nozzle 10 is shown in the left-hand reception 71. The setting element 40 comprises a handle 41 and an actuating element 44. The texturing machine comprises a locking device 30 in the upper region of the receptions 71. The locking device 30 includes a locking carrier 31 and three locking elements 32. For better clarity, only one of the elements is designated in each case. The locking element 32 is held in the locking carrier 31 by way of a cover element 323. The cover element 323, in the present case, is shown in a transparent manner such that two springs 322, which exert a force onto the locking element 32, can be seen inside the locking carrier 31. The cover element 323 is fastened by way of screws 324 on the locking carrier 31. The locking element 32 comprises a recess 321 for receiving a corresponding element of the nozzle 10. As soon as the setting element 40 is moved into contact with the reception 71, the locking element 32 is moved in opposition to the spring force of the springs 323. The locking element 32 consequently releases the receiving contour 711, into which the nozzle 10 can be inserted. The nozzle 10 is inserted as a result of the actuating element 44 of the setting element 40 being moved. The holder 43 is rotated consequently in the receiving element 42. A nozzle 10 received in the holder 43 is rotated with the holder 43 in such a manner that the guide elements 115 (see FIGS. 1 and 2) are rotated into the receiving contour 711 provided for this purpose. Once the setting element 40 has been removed, the locking element 32 is released. The locking element 32 engages in the locking structure 114 (see FIG. 5) of the nozzle 10 by way of its recess 321. The nozzle 10 is consequently held in the reception 71 by way of the locking device 30.

Figure 4:
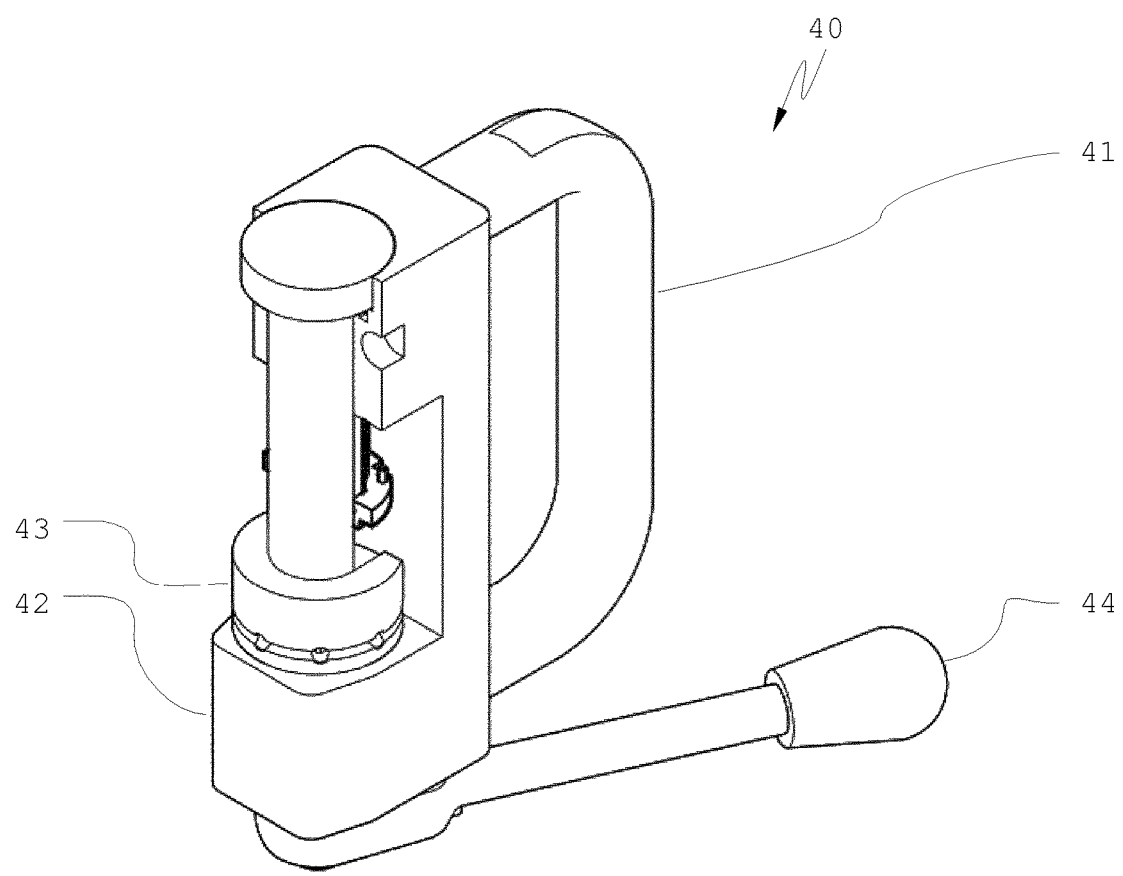
FIG. 4: shows the setting element from FIG. 3

FIG. 4 shows a perspective view of a setting element, the rotatable holder 43 being visible in the receiving element 42. The holder comprises, in its lower region in FIG. 4, cylindrical recesses in which a spring-mounted ball engages as a locking element. The recesses are connected together by means of a groove. This makes it possible for the operator, for example through haptic feedback, to ascertain when the holder is in a predefined position. The handle 41 of the setting element 40 consists of plastics material and is screw-connected to the receiving element 42. An actuating element 44 is situated in the lower region of the setting element 40.

Figure 5:
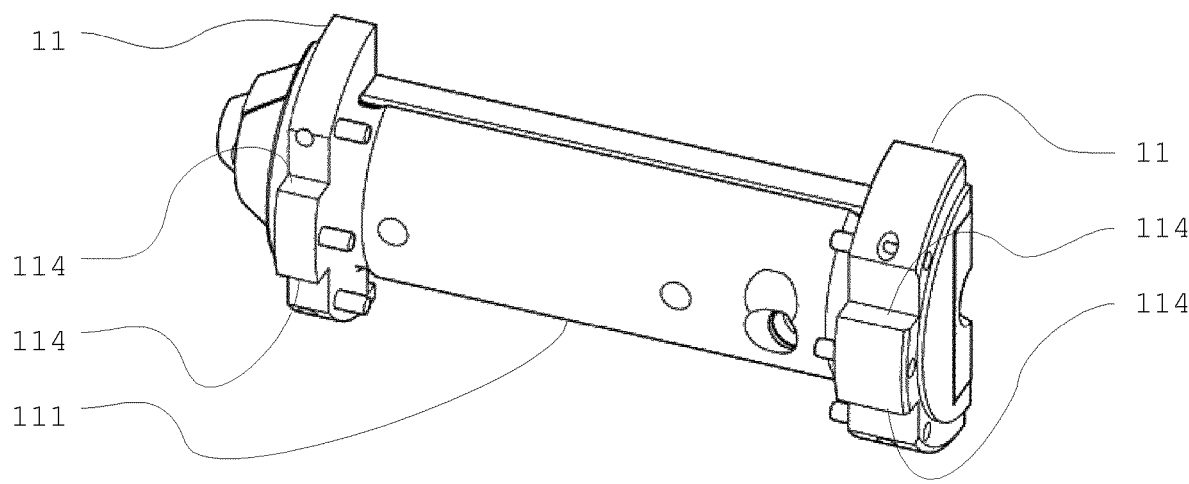
FIG. 5: shows a rear view of the molded part from FIG. 1

FIG. 5 shows a further view of the molded part 12 with the housing 111 and the flanges 11 in a rear view. A locking structure 114, which, in the present case, consists substantially of two planar surfaces which are situated opposite one another, is shown on the flanges 11. These are produced in such a manner that they interact with a locking element 32 of a locking device 30 (see FIG. 3).

Figure 6:
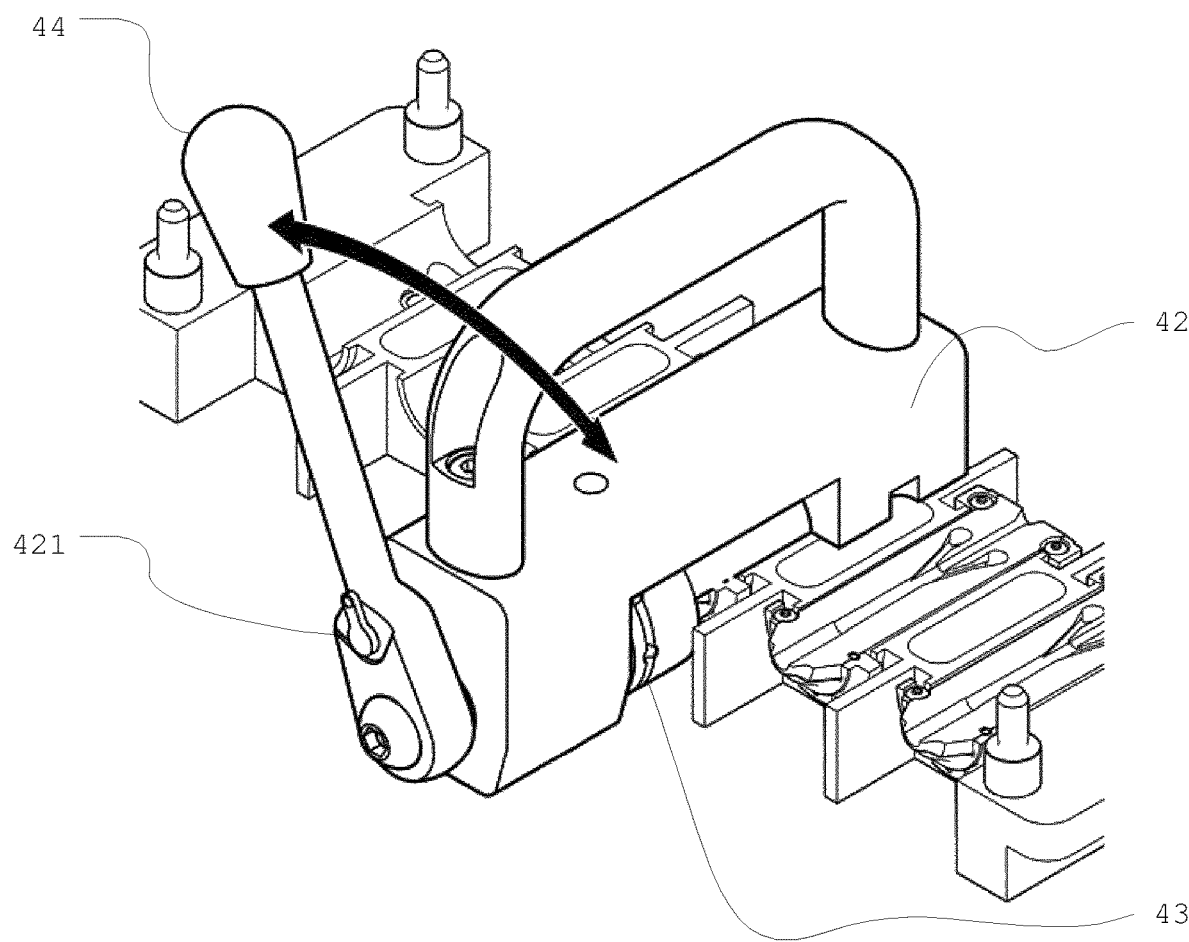
FIG. 6: shows a further view of the setting element according to FIG. 3

FIG. 6 shows a further detail of a setting element 40 during removal of a replacement nozzle from a storage device. The actuating element 44 is clearly visible in this connection. The actuating element, in the present case, is realized as a ratchet, a changeover element 421 being visible on the actuating element 44. Moving the changeover element 421 makes it possible to rotate the actuating element 44 together with the holder 43 in a predetermined direction and to block them in the opposite direction.

Figure 7:
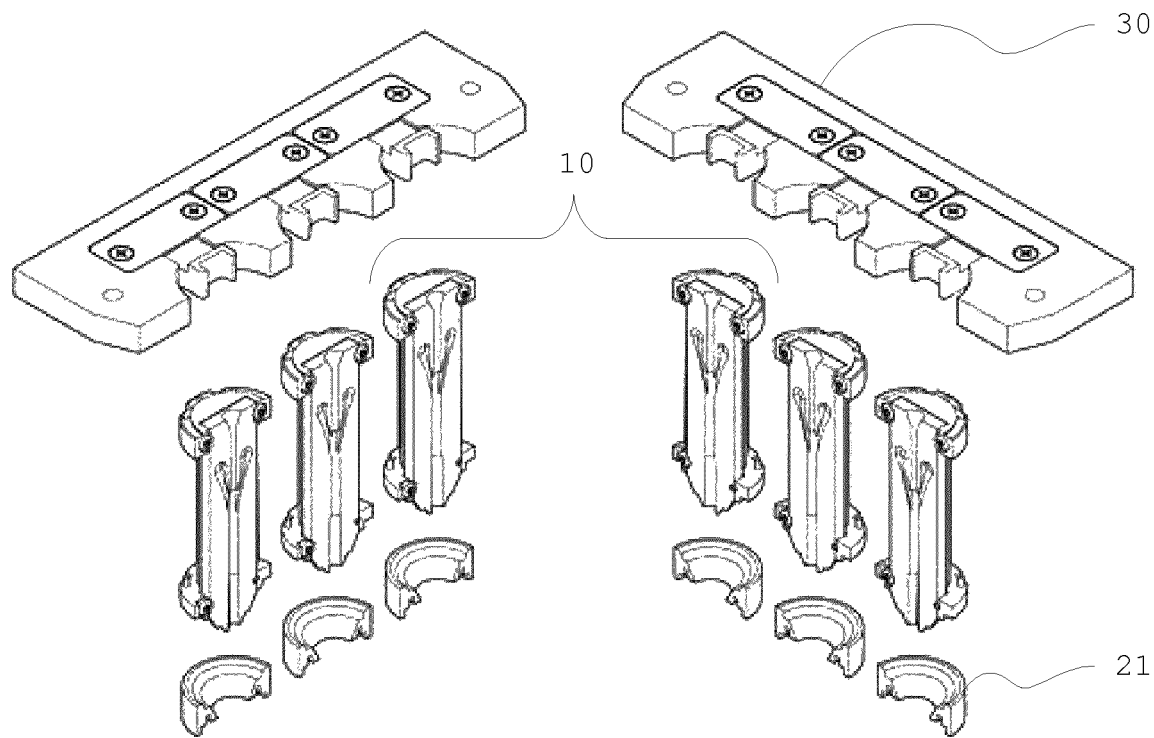
FIG. 7: shows an expansion kit

FIG. 7 shows an expansion kit for expanding a texturing machine. The expansion kit includes a nozzle 10 which has two halves, each half including one molded part 12 and several flanges 11. One or several inlet elements 21 also belong to the expansion kit. The expansion kit is preferably formed as in the present case from two locking devices 30, three nozzles 10 and six inlet elements 21.

Figure 8:
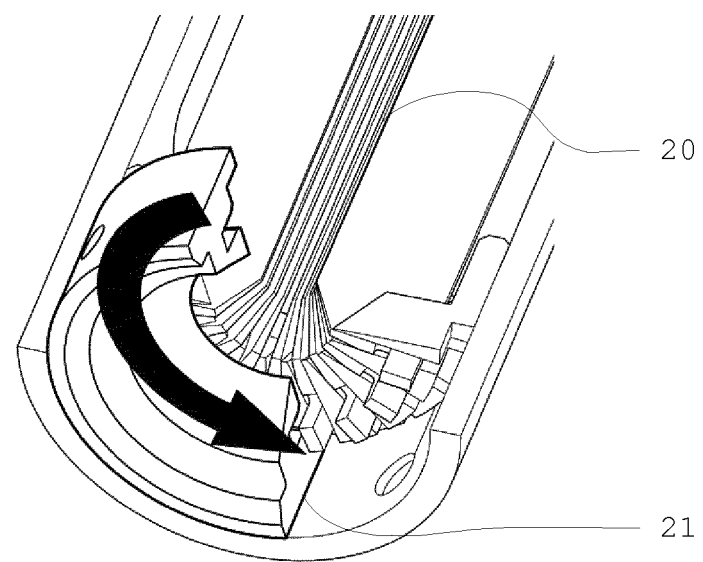
FIG. 8: shows an inlet element

FIG. 8 shows the detail of a stuffer box 20 which comprises an inlet element 21 at its end. As shown in the image in FIG. 8, the inlet element 21 can be fastened on the lamellae of the stuffer box 20 as a result of a rotational movement.

The invention claimed is:

1. A locking device for locking one or multiple nozzles for stuffer-box crimping, for a stuffer-box crimping operation, wherein the locking device includes:
    at least one locking carrier,
    at least one locking element having an unfastened position and a fastened position,
    the locking element comprises at least one recess for receiving a locking structure of a nozzle, wherein
    the locking carrier comprises at least one cutout configured to radially receive the at least one nozzle in a rotatable manner when the locking element is in the unfastened position and in a non-rotatable manner when the recess of the locking element received the locking structure of the nozzle in the fastened position,
    the locking elements are fastened or are fastenable in a movable manner on the locking carrier, and
    the locking elements are arranged or are arrangeable in such a manner that a directed force acts on the locking elements in the direction of the at least one nozzle which is receivable in the recess.

2. The locking device as claimed in claim 1, wherein the directed force is provided by at least one spring.

3. The locking device as claimed in claim 1, wherein the locking elements are fastened or are fastenable in a releasable manner on the locking carrier.

4. The locking device as claimed in claim 1, wherein the locking carrier is produced at least in part from plastic material.

5. The locking device as claimed in claim 1, wherein the locking elements are produced at least in part from metal.

\* \* \* \* \*